United States Patent [19]

Narishige et al.

[11] Patent Number: 4,939,610
[45] Date of Patent: Jul. 3, 1990

[54] THIN FILM MAGNETIC HEAD HAVING MAGNETIC CORE INCLUDING A THIN FILM OF COBALT ALLOY

[75] Inventors: Shinji Narishige, Mito; Masaaki Sano, Hitachi; Kouichi Nishioka, Hitachi; Takao Imagawa, Hitachi; Masanobu Hanazono, Mito; Tetsuo Kobayashi, Kanagawa; Toshihiro Yoshida, Odawara, all of Japan

[73] Assignee: Hitachi, Ltd., Tokyo, Japan

[21] Appl. No.: 252,603

[22] Filed: Oct. 3, 1988

[30] Foreign Application Priority Data

Oct. 5, 1987 [JP] Japan ................................ 62-249829

[51] Int. Cl.$^5$ ................................................ G11B 5/16
[52] U.S. Cl. .................................................... 360/126
[58] Field of Search ......................... 360/126, 125, 127

[56] References Cited

FOREIGN PATENT DOCUMENTS 61-76642 4/1986 Japan .

Primary Examiner—John H. Wolff
Attorney, Agent, or Firm—Antonelli, Terry, Stout & Kraus

[57] ABSTRACT

A thin film magnetic head is disclosed which includes a substrate, a first magnetic core disposed on the substrate, a second magnetic core forming a magnetic path in conjunction with the first magnetic core, a conductor coil wound in the magnetic path and a gap formed between ends of the first magnetic core and the second magnetic core. At least one of the first magnetic core and the second magnetic core includes a thin film of a cobalt alloy. The cobalt alloy includes 20-70 atomic percent of cobalt, 20-60 atomic percent of nickel, 12-30 atomic percent of iron and 5-32 atomic percent of palladium.

18 Claims, 6 Drawing Sheets

FIG. I
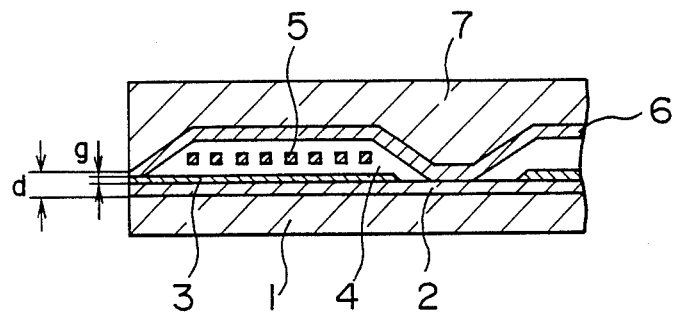
FIG. 2
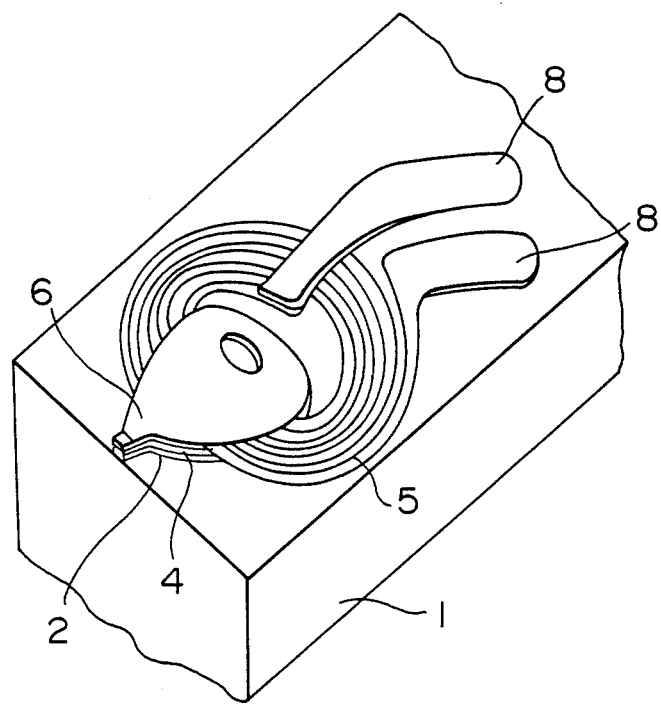

(a) SINGLE LAYER FILM (b) MULTI-LAYER FILM

THIN FILM MAGNETIC HEAD HAVING MAGNETIC CORE INCLUDING A THIN FILM OF COBALT ALLOY

BACKGROUND OF THE INVENTION

The present invention relates to a thin film magnetic head, a magnetic thin film used as a magnetic core of the thin film magnetic head, and a method for fabricating the magnetic thin film.

A thin film magnetic head according to the present invention is suitable to be incorporated into a magnetic disk unit in a computer.

A thin film magnetic head according to the present invention has both write and read functions, and is applicable to a thin film magnetic head used for both write and read operation.

In a magnetic core material of a conventional thin film magnetic head, permalloy which refers to binary alloys comprising approximately 80 weight percent of nickel and approximately 20 weight percent of iron is used. Since this material has a magnetostriction constant close to zero and high permeability at high frequency regions, a thin film magnetic head using this magnetic core has excellent readout performance.

Since permalloy has a saturation flux density as low as approximately 1 tesla, a thin film magnetic head using permalloy is inferior in writing performance for high recording density. To be concrete, a high coercive force material tends to be used as a material of a recording medium in a magnetic disk unit from the viewpoint of a raised recording density. Further, the thickness of the front end of a thin film magnetic head, i.e., the pole thickness tends to be made small. Therefore, the saturation flux density of 1 tesla of permalloy causes an insufficient magnetic field intensity for writing operation, resulting in insufficient writing performance.

Magnetic disk units tend to increase more and more in capacity and increase in recording density as well therewith.

In a large-capacity magnetic disk unit of 20 gigabytes or more, the core material of the thin film magnetic head is desired to have a higher saturation flux density than that of permalloy. Further, it is demanded to have soft magnetic properties and the uniaxial anisotropy in the same way as permalloy, a small coercive force, a magnetostriction constant close to zero, and excellent corrosion resistance.

As described in JP-A No. 61-76642, a ternary cobalt-nickel-iron alloy thin film investigated by the present inventors with an electroplating method is a material nearly satisfying the above described demands. It is possible to endow the ternary cobalt-nickel-iron alloy thin film with soft magnetic properties and uniaxial anisotropy by alternately applying magnetic fields, which are in parallel to the film surface and perpendicular to each other, when the film is formed.

The present inventors confirmed that a magnetic core comprising a ternary cobalt-nickel-iron alloy thin film fabricated by using a plating method had poor heat resistance and its magnetic characteristic changed under the influence of heat generated in the magnetic head fabrication process. To be concrete, the present inventors confirmed that uniaxial anisotropy and the soft magnetic properties were adversely affected and the coercive force became large. The present inventors also confirmed that if an alloy film of a composition range exhibiting a fine magnetic characteristic in a plated film, i.e., an alloy film comprising 60 to 90 weight percent (59.6 to 86.8 atomic percent) of Co, 10 to 30 weight percent (10.2 to 29.9 atomic percent) of Ni, and 3 to 10 weight percent (3.2 to 10.5 atomic percent) of Fe was fabricated by using a sputtering method, the heat resistance could be improved, but the magnetic characteristic was significantly deteriorated.

SUMMARY OF THE INVENTION

An object of the present invention is to provide a thin film magnetic head comprising a magnetic core which exhibits a heat resistance property with respect to heat applied in the fabrication process of the thin film magnetic head and which exhibits a magnetic characteristic nearly equivalent to that of a ternary Co-Ni-Fe alloy plated film.

Another object of the present invention is to provide a magnetic thin film for a magnetic core, which exhibits a heat resistance property and a magnetic characteristic nearly equivalent to that of the Co-Ni-Fe alloy plated film, and a fabrication method therefor.

In accordance with the present invention, in a thin film magnetic head including a first magnetic core disposed on a substrate, a second magnetic core forming a magnetic path in conjunction with the first magnetic core, a conductor coil disposed along the magnetic path, and a magnetic gap formed between ends of the first magnetic core and the second magnetic core, at least one of the first magnetic core and the second magnetic core is constituted by a cobalt alloy thin film comprising 20 to 70 atomic percent of cobalt, 20 to 60 atomic percent of nickel, 12 to 30 atomic percent of iron, and 5 to 32 atomic percent of palladium.

From the viewpoint of increasing recording density, a magnetic core of a thin film magnetic head tends to become thin in thickness and is expected to be probably 2 $\mu$m or less in application to a large-capacity disk unit having 20 gigabytes or more. In the description of the present invention, therefore, cobalt alloy thin films have a thickness of 2 $\mu$m or less unless otherwise noted.

The cobalt alloy thin film having the above described component composition can be endowed with soft magnetic properties and the uniaxial anisotropy and with a hard axis of magnetization in the magnetic path direction by alternately applying magnetic fields which are in parallel to the film surface and perpendicular to each other in the film forming process using the sputtering method.

The present inventors confirmed that this cobalt alloy sputtered film hardly changed in magnetic characteristic even if it was influenced by heat in the fabrication process of the thin film magnetic head and maintained the magnetic characteristic obtained when the film was formed. The present inventors confirmed that an alloy belonging to a range of 20 to 70 atomic percent of Co, 20 to 60 atomic percent of Ni, 12 to 30 atomic percent of Fe, and 5 to 32 atomic percent of Pd had a magnetic characteristic nearly equivalent to that of a ternary Co-Ni-Fe alloy plated film.

In a cobalt alloy film formed by a sputtering method, crystals grow in a direction perpendicular to the film surface, and columnar crystal structures are formed. The ratio h/d of the height h of a columnar crystal having a columnar crystal structure and its width d slightly changes with the film thickness and the substrate heating temperature. In average, however, the ratio h/d is typically 10 or more. The crystal lattice is a face-centered cubic lattice.

On the other hand, a cobalt alloy film formed by using an electroplating method has a granular crystal structure and a ratio h/d of approximately unity, where h is the height of the granular crystal and d is its width.

When a film is formed by using the sputtering method, the cobalt alloy film can be directly formed on the substrate surface. When a film is formed by using electroplating, an undercoat is necessary between the substrate and the cobalt alloy plated film. As a result, it is also simpler in structure to form a magnetic core by using sputtering.

A cobalt alloy sputtered film having the component composition of the present invention has a coercive force of 2 oersteds or less. The ternary Co-Ni-Fe alloy film formed by using an electroplating method as described in JP-A No. 61-76642 has a coercive force of approximately 1 oersted immediately after the film is formed. After the thin film magnetic head has been fabricated, the coercive force becomes approximately 10 oersteds or more as a result of thermal hysteresis. As compared therewith, the coercive force of a sputtered film according to the present invention is significantly lower.

The electroplated cobalt alloy thin film described in JP-A No. 61-77642 has an iron content of 3 to 10 weight percent (i.e., approximately 3.2 to 10.5 atomic percent). It was found that the coercive force increased if the Fe content was in this range when the film was made by using sputtering. And it was found that the coercive force could be made small even in the sputtered film by making the Fe content 12 atomic percent or more. However, there occurred a new problem that the magnetostriction constant became large as the Fe content increased. However, it was found that the magnetostriction constant could be made small while preventing a significant increase of coercive force by adding 6 to 32 atomic percent of palladium. By adding palladium, an effect of excellent corrosion resistance as compared with the ternary cobalt-nickel-iron alloys described in JP-A No. 61-76642 is also obtained.

As prior art relating to magnetic alloys containing palladium, a bulk material of cobalt alloys as described in JP-A No. 53-51123 and JP-A No. 54-104438 can be mentioned. The ingot of this cobalt alloy bulk material is made in a melting furnace. This material is mainly used as a corrosion resistant material for dentists, and its use in a magnetic core of a thin film magnetic head is not described at all.

Judging from the contents of "Ferromagnetism" written by Bozorth and published by Van Nostrand Company, the fourth issue, pages 165, 169, 152 and 675, in which the relations between the composition of ternary Co-Ni-Fe bulk alloys and their saturation flux density, coercive force, crystal magnetic anisotropy and magnetostriction constant are described, the bulk material is completely different from the plated film or the sputtered film in magnetic characteristics. The bulk material is not suitable for a magnetic core material of a thin film magnetic head.

The present inventors confirmed that ternary Co-Ni-Fe alloys exhibiting a high saturation magnetic flux density and a magnetostriction constant close to zero, which were formed into a thin film as a bulk material by using a sputtering method, did not exhibit uniaxial anisotropy and had a significantly high coercive force $H_{CH}$ in the direction of the hard axis of magnetization.

BRIEF DESCRIPTION OF THE DRAWINGS

FIG. 1 is a sectional view of a magnetic head fabricated by using an alloy thin film according to the present invention.

FIG. 2 is an oblique view of a device obtained by cutting out the magnetic head from the substrate.

DESCRIPTION OF THE PREFERRED EMBODIMENTS

By making the Fe content of the cobalt-nickel-iron alloy film 12 atomic percent or more and forming a film by using a sputtering method, the coercive force can be made small.

On the other hand, however, the magnetostriction constant becomes large. By adding palladium, however, the magnetostriction constant can be reduced without increasing the coercive force.

Figure 7:
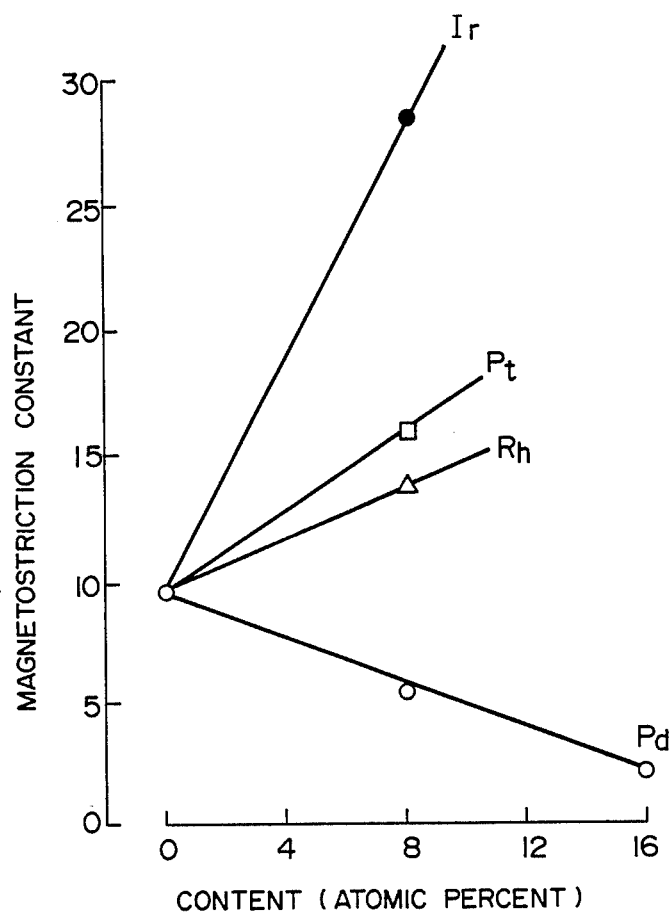
FIG. 7 is a characteristic diagram for explaining the result of consideration performed to find out the present invention.

For a sputtered film of ternary cobalt-nickel-cobalt alloys, the present inventors chose a composition region where the magnetostriction constant exhibits a large positive value, but the crystal magnetic anisotropy is relatively small. That is to say, the present inventors chose a composition range comprising 20 to 70 atomic percent of cobalt (Co), 20 to 60 atomic percent of nickel (Ni) and 12 to 30 atomic percent of iron (Fe). With regard to improvement of corrosion resistance, the present inventors added an element of platinum metals such as rhodium (Rh), palladium (Pd), iridium (Ir) or platinum (Pt), and investigated a change of the magnetostriction constant of the film at that time. The experiment was performed by using RF magnetron sputtering, and argon (Ar) gas was used as sputtering gas. Addition of elements of platinum metals was performed by arranging a piece of an element to be added on a target having predetermined base composition and by using the sputtering-up method. The result is shown in FIG. 7. FIG. 7 shows magnetostriction constants of a film obtained when an appropriate number of pieces (decagon) of Rh, Pd, Ir and Pt are disposed on a target of $Co_{48}Ni_{30}Fe_{22}$ and sputtered. It was understood from FIG. 7 that elements belonging to the identical platinum metals exerted different influence upon the magnetostriction constant of the ternary Co-Ni-Fe alloy thin film. It was found that only Pd reduced the magnetostriction constant of the ternary Co-Ni-Fe alloy thin film and reduced it from a positive value to a negative value.

Further, the coercive force did not become large when Pd was added even if the temperature of the substrate in film fabrication was raised. Therefore, it was found that addition of Pd functioned to reduce only the magnetostriction constant without largely changing the crystal magnetic anisotropy constant. It was found that the coercive force was rather reduced when the substrate temperature was raised by adding Pd. The desirable substrate temperature is 200° C. to 400° C.

The composition of the ternary Co-Ni-Fe alloys forming the base of a magnetic core used in a thin film magnetic head of the present invention is defined on the basis of both the crystal magnetic anisotropy constant and the saturation flux density. That is to say, a composition region is so defined that the crystal magnetic anisotropy constant may approach zero as closely as possible and the saturation flux density may become as high as possible. Since Pd is a nonmagnetic element, the saturation magnetic flux density decreases and the coercive force increases as the amount of addition of Pd is increased. It is necessary to define the composition of the base alloy with due regard to these facts. That is to say, the base comprises 20 to 70 atomic percent of Co, 20 to 60 atomic percent of Ni, and 12 to 30 atomic percent of Fe. Therefore, the resultant composition is expressed as [Co 20–70 . Ni 20–60 . Fe 12–30] - Pda. The value of a satisfying the relation $5 \leq a \leq 32$ atomic percent is desirable.

The reason why Co is limited to the range of 20 to 70 atomic percent will now be described. If the content is 20 atomic percent or less, the crystal magnetic anisotropy constant becomes small and the coercive force becomes small. However, the saturation flux density becomes 1.0 tesla or less and does not exceed that of conventional permalloy. By the addition of Pd, the saturation flux density further decreases and the intended object is not attained. If the content is 70 atomic percent or more, the crystal magnetic anisotropy constant becomes significantly large and the coercive force becomes large. Further in this case, crystallization of the hexagonal system also occurs and the value of the magnetostriction becomes unstable. The reason why the content of Fe is limited to the range of 12 to 30 atomic percent will now be described. If the content is 12 atomic percent or less, the magnetostriction constant is close to zero, but the crystal magnetic anisotropy constant becomes significantly large in the same way as the case where the Co content is large. In this case, therefore, uniaxial anisotropy is not exhibited, and the coercive force becomes 10 oersteds or more. If the Fe content is 30 atomic percent or more, the crystal magnetic anisotropy constant becomes small and the coercive force becomes low. In this case, however, the magnetostriction constant becomes larger than $15 \times 10^{-6}$, and the amount of addition of Pd required for making the magnetostriction constant close to zero becomes large, disadvantageously resulting in a lowered saturation magnetic flux density and an increased coercive force. On the basis of the saturation magnetic flux density and the crystal magnetic anisotropy constant, the contents of Co and Fe are defined, and Ni functions only to fill up the remaining content. If the Ni content is 20 atomic percent or less, the saturation magnetic flux density becomes high, but the magnetostriction constant becomes unstable as a result of crystallization of body-centered cubic crystals. If the Ni content is 60 atomic percent or more, the saturation magnetic flux density becomes low. By the addition of Pd, the saturation magnetic flux density further decreases, and the intended object is not attained. Therefore, the range of 20 to 60 atomic percent is chosen as the Ni content.

A magnetic core of the present invention is endowed with heat resistance, which is absent in an electroplated film, by forming a film by a sputtering method. Since palladium is contained, the magnetic core of the present invention is excellent in corrosion resistance as well as compared with the ternary Co-Ni-Fe alloy film.

It is desirable to use a mixed gas comprising argon gas and nitrogen gas as the atmosphere for sputtering and make the content of nitrogen gas equal to 1 to 6 volumetric percent. In this way, the coercive force can be made smaller as compared with atmosphere containing only argon gas.

The present inventors confirmed that the effect of lowering the coercive force caused by use of mixed gas atmosphere comprising argon and nitrogen was absent in the ternary Co-Ni-Fe (10 atomic percent or less) alloy sputtered film. The reason can be explained as follows. In a region of Fe content of 10 atomic percent or less in which the magnetostriction constant becomes negative from zero, the crystal magnetic anisotropy is very large, and the anisotropy dispersion becomes intense. Since $H_{CH}$ thus increases, the atmospheric gas is kept from exerting effort.

If the Fe content is made 12 atomic percent or more, the crystal magnetic anisotropy becomes small, and the effect caused by the sputtering atmosphere appears.

In sputtering, it is desirable to heat the substrate to a temperature of approximately 200° to 400° C. This also functions to lower the coercive force.

In the fabrication process of a thin film magnetic head, heat is applied when a magnetic core is fabricated and when a nonmagnetic insulation material is coated in a space surrounded by the conductor coil and the magnetic core. When a polyimide resin, for example, is used as the nonmagnetic insulation material, heat around approximately 350° C. is applied to thermoset the resin. It is desirable to form a sputtered film so that the magnetic characteristic of the magnetic core may not be harmed even under the influence of heat.

In a magnetic core according to the present invention, it is desirable to choose a composition in a composition range comprising 20 to 70 atomic percent of Co, 12 to 30 atomic percent of Fe, 20 to 60 atomic percent of Ni, and 5 to 32 atomic percent of Pd, so that the magnetostriction constant may become $+2 \times 10^{-6} 2 \times 10^{-6}$ and the saturation magnetic flux density may become 1.2 tesla or more. In this case, it is more desirable to keep the coercive force at 2 oersteds or less.

By doing so, a magnetic core suitable to a large-capacity magnetic disk unit having 20 gigabytes or more is obtained.

A magnetic core may be formed by alternately laminating cobalt alloy thin films and films comprising other materials. By doing so, the coercive force can be lowered. Further, the sputtered film has a columnar crystal structure, and its magnetic characteristic tends to lower as the ratio h/d of the height h of the columnar crystal to the width d thereof becomes large. However, the growth of the columnar crystal can be suppressed by interposing another film between the sputtered films.

Another film interposed between the cobalt alloy films may be either of a magnetic film and a nonmagnetic film. Considering that a magnetic influence is not exerted upon the cobalt alloy film, a nonmagnetic film is preferred.

As a nonmagnetic film, a ceramic such as alumina is suitable.

The total thickness of the cobalt alloy films and other films becomes equal to the thickness of the magnetic core comprising only a single cobalt alloy film.

The Co-Ni-Fe-Pd alloy magnetic core material according to the present invention may comprise one or more of yttrium, titanium, zirconium, hafnium, molybdenum, copper, indium, silicon, bismuth, aluminum, iridium, rhodium and platinum so that the total may be 1 atomic percent or less.

Embodiments of the present invention will now be described by referring to the drawings.

EMBODIMENT 1

In FIG. 1, on a ceramic substrate 1 with a surface sufficiently rubbed and cleaned, a Co-Ni-Fe-Pd alloy thin film having layer thickness of 1.0 μm is deposited by using an RF sputtering method as a first magnetic core 2. At this time, the composition of the magnetic film is a quaternary Co-Ni-Fe-Pd alloy thin film comprising 33 atomic percent of Co, 24 atomic percent of Ni, 18 atomic percent of Fe, and 25 atomic percent of Pd. As a result of evaluating the magnetic characteristics by using a dummy substrate sputtered at the same time, the saturation magnetic flux density was 1.3 tesla, the coercive force 1.5 oersteds, and the magnetostriction constant $+0.8 \times 10^{-6}$.

A sputtering target was formed by placing a plurality of $10 \times 10$ mm Pd chips on Co-Ni-Fe alloys. Sputtering was performed under the condition that the substrate temperature was 250° C., the sputtering gas was Ar, and the gas pressure was 0.6 m Torr. However, the substrate temperature can be selected in a range of 20° C. to 400° C., preferably in a range of 200° C. to 400° C. As the sputtering gas, Ar or $Ar+N_2$ can be selected. The gas pressure can be selected in a range of 0.3 to 1.0 m Torr. In this case, the composition of the magnetic thin film can be adjusted by means of sputter ratios of respective chemical elements defined by the sputtering conditions and the ratio of the surface area of the Co-Ni-Fe alloys to that of the Pd chips. Considering the sputter ratios of respective elements on the basis of the desired component ratio of the magnetic thin film, the above described surface area ratio is defined and the number of Pd chips is chosen. Alternatively Co-Ni-Fe-Pd alloys having composition corresponding to the desired component ratio may be used as the target.

As described above, magnetic fields which were in parallel to the surface of the magnetic thin film and perpendicular to each other were alternately applied throughout the whole process of sputtering and during a period lasting from the completion of sputtering until the substrate temperature dropped to approximately 150° C. in order to endow the thin film with the soft magnetic properties and the uniaxial anisotropy.

After sputtering, the first magnetic core was patterned into a predetermined core shape by using the ion milling method.

Subsequently, a nonmagnetic gap film 3 comprising $Al_2O_3$ or the like, an organic insulation film 4 such as a polyimide resin, and a conductor coil 5 were deposited by using the thin film technique and were patterned into predetermined shapes by using the ion milling method or the wet etching method, for example. Thereon, a film having a composition similar to that of the first magnetic core 2 was sputtered as a second magnetic core 6, and patterned into a predetermined magnetic core shape by using the ion milling method. Thereafter, an alumina film was formed over the entire surface of the substrate as an insulation film to provide a guard film 7.

Subsequently, a head device was cut out from the substrate 1. The front end side of the magnetic head was polished up to a predetermined dimension and a magnetic gap g was formed. Lead wires were connected to ends of the conductor coil to form a single thin film magnetic head. The dimension of the magnetic gap g was defined to be approximately 0.5 μm. Pole thickness d, which is the sum of the dimension of the magnetic gap, thickness of the upper magnetic core and thickness of the lower magnetic core, was defined to be approximately 3.5 μm. FIG. 1 is a sectional view of a part of the magnetic head. FIG. 2 is an oblique view of the thin film magnetic head thus cut out. The shape of the section of the magnetic core becomes trapezoidal as a result of ion milling, and the length of the upper face becomes larger than that of the lower face. Numeral 8 of FIG. 2 denotes a terminal.

In this embodiment, each of the first magnetic core and the second magnetic core comprises a single magnetic film. However, the present invention is not limited to this embodiment.

FIG. 1 shows the section of the central part of the thin film magnetic head. The first magnetic core 2 and the second magnetic core 6 have a predetermined magnetic gap g at the front end of head (i.e., at the left end of FIG. 1) confronting a magnetic recording medium which is not illustrated. The first magnetic core 2 and the second magnetic core 6 are magnetically connected in the rear at a long distance from the magnetic gap to form a magnetic path. Between the first magnetic core 2 and the second magnetic core 6, the conductor coil 5 having a predetermined number of turns is so provided as to pass between them and intersect the magnetic circuit. The space surrounded by the first magnetic core 2, the second magnetic core 6 and the conductor coil 5 is filled up by an organic insulation film 4 comprising an electrical insulator. To be concrete, the space is filled with a polyimide resin.

If a current is allowed to flow through the conductor coil 5 of the thin film magnetic head having such a structure, a strong magnetic field is generated in the magnetic gap g. Information is recorded onto the magnetic recording medium by this magnetic field. When the magnetic recording medium with information recorded thereon passes the vicinity of the magnetic gap g, magnetic flux directed from the second magnetic core 6 to the first magnetic core 2 and vice versa alternately with short time intervals is generated. As a result, voltage is induced on the conductor coil 5, and information recorded on the magnetic recording medium is reproduced.

Electrical characteristics of a thin film magnetic head thus fabricated were compared with electrical characteristics of a conventional thin film magnetic head using permalloy. As a result, the overwrite characteristics were improved by approximately 4 to 5 dB as compared with a thin film magnetic head using permalloy, and the recording magnetic field intensity was improved by approximately 30%. This result is sufficiently applicable to high-coercive force media for high recording density.

EMBODIMENT 2

Under conditions similar to those of the embodiment 1, four magnetic layers, each of which had thickness of 0.25 μm, were laminated, and $Al_2O_3$ films, each of which has thickness of 0.004 μm, were interposed between the magnetic layers. This was used as a magnetic core. Electrical characteristics of a thin film magnetic head comprising magnetic cores thus fabricated were investigated. As a result, the overwrite characteristic and the writing magnetic field intensity were nearly equivalent to those of the embodiment 1. In addition, the reading performance was improved by approximately 20%. It was thus found that this thin film magnetic head was excellent. This is caused by the fact that use of multi-layers further decreases the coercive force and hence improves the permeability as understood from embodiment 6 which will be described later.

EMBODIMENT 3

Figure 3:
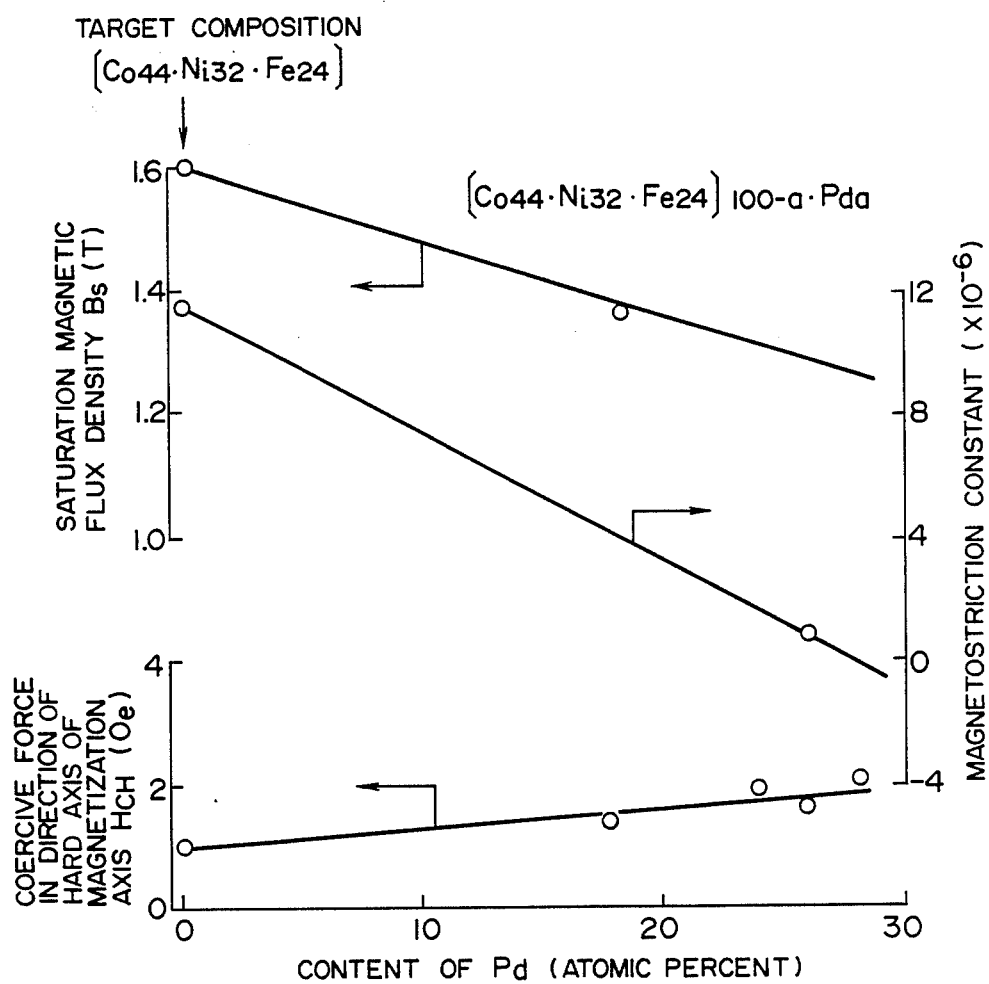
FIGS. 3 to 6 are characteristic diagrams for explaining embodiments of the present invention.

On an alloy target comprising ternary Co-Ni-Fe alloys having a composition represented as 44 atomic percent of Co, 32 atomic percent of Ni and 24 atomic percent of Fe, an appropriate number of Pd chips (10 mm square) were placed and sputtered to fabricate a quaternary Co-Ni-Fe-Pd alloy thin film. Relations between the composition and magnetic characteristics obtained at that time are shown in FIG. 3. The composition of the target is represented as 44 atomic percent of Co, 32 atomic percent of Ni and 24 atomic percent of Fe, and the crystal magnetic anisotropy constant is close to zero under this target composition.

Therefore, the coercive force is small. However, the magnetostriction constant exhibits a large positive value of approximately $12 \times 10^{-6}$. The saturation magnetic flux density is approximately 1.6 tesla. As for the sputtering conditions, the substrate temperature is 300° C., the sputtering gas is Ar+2% $N_2$ mixed gas, and the gas pressure is $6 \times 10^{-4}$ Torr.

On this target, Pd chips were placed. It was found that as the number of chips was increased the saturation magnetic flux density and the magnetostriction constant dropped nearly linearly and, on the contrary, the coercive force increased nearly linearly and gradually. The content of Pd whereat the magnetostriction constant became $+2 \times 10^{-6}$ was approximately 23 atomic percent. At this time, the saturation magnetic flux density was approximately 1.32 tesla, and the coercive force was approximately 1.7 oersteds, excellent characteristics being exhibited. Further, it was found that the content of Pd at which the magnetostriction constant exhibited a small negative value of $-2 \times 10^{-6}$ was approximately 30 atomic percent and at this time the saturation magnetic flux density was approximately 1.24 tesla and the coercive force was approximately 2.0 oersteds. By comparing these results with those of permalloy exhibiting the same magnetostriction constant, it was found that the saturation magnetic flux density increased by approximately 25 to 30%. Addition of Pd appeared to bring about the same effect as that of Ni because it reduced the magnetostriction constant. In this case, however, increase of the coercive force was slight. Unlike Ni, therefore, it was found that Pd functioned to reduce only the magnetostriction constant without changing the crystal magnetic anisotropy constant so much.

EMBODIMENT 4

Figure 4:
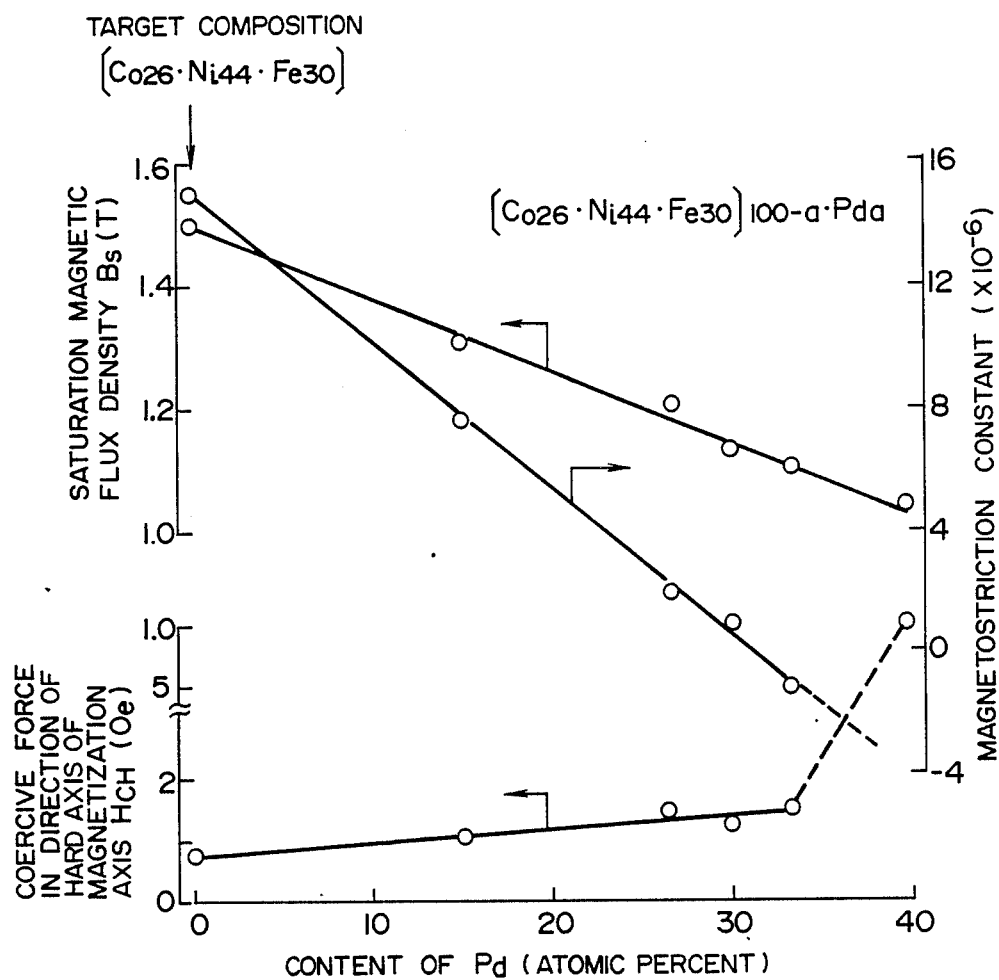

By using a method similar to that of the embodiment 3, the target composition was defined as 26 atomic percent of Co, 44 atomic percent of Ni and 30 atomic percent of Fe so that the saturation magnetic flux density would be approximately 1.5 tesla, i.e., a slightly lower value as compared with the target of the embodiment 3 and the crystal magnetic anisotropy constant would be closer to zero as compared with the embodiment 3 to reduce the coercive force. Pd chips were placed on the target and sputtered to make a quaternary Co-Ni-Fe-Pd thin film. The sputtering condition and the sputtering method were made equivalent to those of the embodiment 3, but the substrate temperature was defined to be 350° C. The result is shown in FIG. 4. As the number of Pd chips is increased, the saturation magnetic flux density and the magnetostriction constant decrease nearly linearly in the same way as the embodiment 3. The coercive force increases nearly linearly and gradually as Pd content increases. When the content of Pd becomes 32.5 atomic percent or more, however, the coercive force abruptly increases and uniaxial anisotropy disappears.

Assuming now that the magnetostriction constant is $+2 \times 10^{-6}$, the saturation magnetic flux density is approximately 1.2 tesla and the coercive force is approximately 1.5 oersteds. The Pd content at this time is 27 atomic percent. When the magnetostriction constant exhibits a small negative value of $-1 \times 10^{-6}$, the Pd content is approximately 32 atomic percent. At this time, the saturation magnetic flux density is approximately 1.1 tesla, and the coercive force is approximately 1.5 oersteds. Because the coercive force abruptly increases when the Pd content becomes 32.5 atomic percent or more, the maximum value of Pd is 32 atomic percent.

As shown in the above described embodiments 3 and 4, if the composition of the ternary Co-Ni-Fe alloy film is so defined that the magnetostriction constant may become close to zero while keeping the saturation magnetic flux density high, the film does not exhibit uniaxial anisotropy because the crystal magnetic anisotropy constant is large, resulting in a significantly large coercive force. By adding Pd to form quaternary Co-Ni-Fe-Pd alloys, however, it becomes possible to make a film having small coercive force even if the magnetostriction constant is close to zero.

The lower limit of Pd content is defined by the composition of Co-Ni-Fe alloys serving as the base. As the Ni base side is approached, the content of Pd is decreased. From the viewpoint of balancing the saturation magnetic flux density, the magnetostriction constant becomes close to zero at 5 atomic percent when the content of Ni is 60 atomic percent.

EMBODIMENT 5

Figure 5:
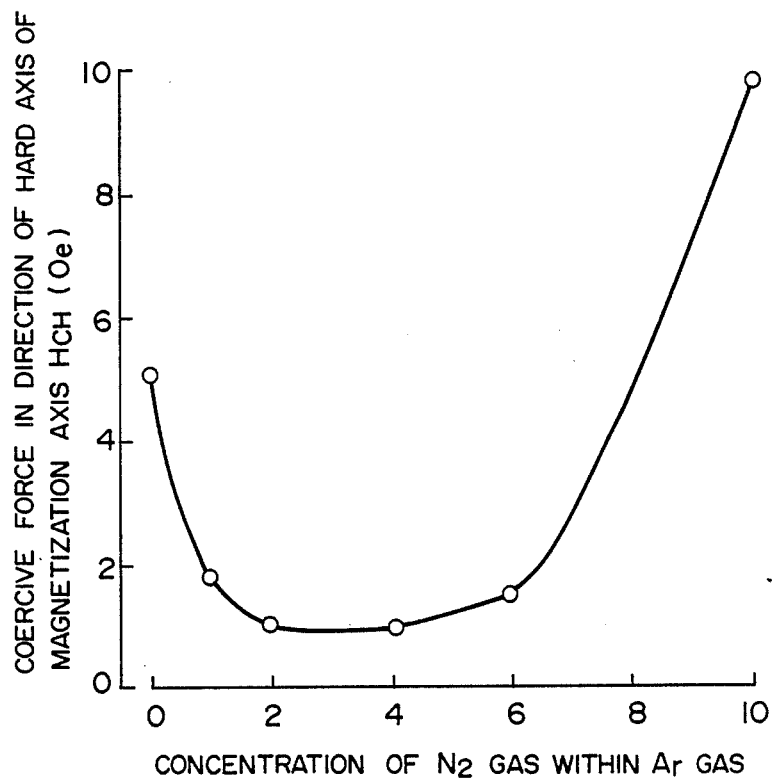

Under the condition that the sputtering gas comprises only Ar gas and under the condition that the sputtering gas is Ar+$N_2$ mixed gas comprising Ar gas with a small amount of $N_2$ gas mixed, the coercive force of the film has been investigated. The result is shown in FIG. 5.

The sputtering conditions other than the sputtering gas are the same as those of the embodiment 4. Since the magnetostriction constant changes little, only the coercive force is shown. As shown in FIG. 5, uniaxial anisotropy is not exhibited and the coercive force exhibits a significantly high value when the sputtering gas comprises only Ar gas. When a small amount of $N_2$ gas is mixed with Ar gas, uniaxial anisotropy is exhibited and the coercive force is reduced. If the amount of $N_2$ gas is increased, however, the B-H curve does not saturate, and the coercive force becomes further larger than that of the case where the sputtering gas comprises only Ar gas. It is understood that the suitable amount of $N_2$ gas mixed with Ar gas is 1 to 6 volumetric percent. When the amount of $N_2$ gas is small, it is considered that $N_2$ gas suppresses columnar crystals in crystal granule growth of the film, makes crystal granules fine, suppresses the effect of crystal magnetic anisotropy, and thereby reduces the coercive force. On the other hand, it is considered that nitrides are educed into the film when the amount of mixture is increased.

EMBODIMENT 6

Figure 6A:
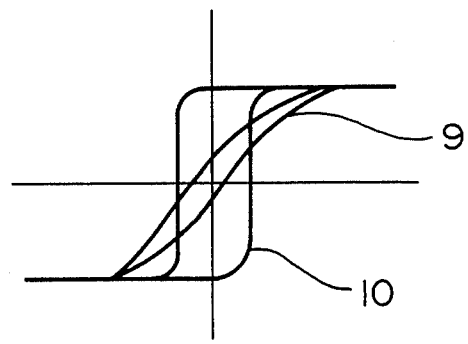
Figure 6B:
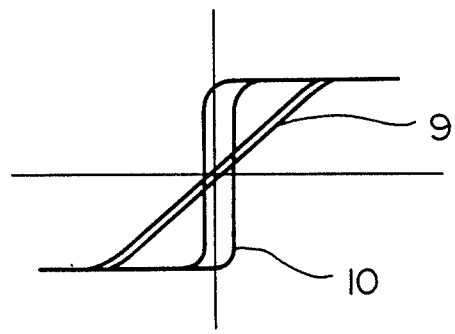

In FIG. 6, B-H curves of a four layer film (b) respectively having a thickness of 0.25 μm made by using a method similar to that of the embodiment 3 are compared with B-H curves of a single-layer film (a) having a thickness of 1.0 μm. An $Al_2O_3$ film having thickness of 0.004 μm is interposed between layers of the multi-layer film.

From FIG. 6, it is understood that the coercive force in the direction of the hard axis of magnetization is reduced to 0.5 oersteds, i.e., approximately ¼ by using the four layer film.

By using this four layer film as a magnetic film for a thin film magnetic head, the readout performance has improved by approximately 20%. This is caused by the fact that the permeability has been improved by an amount of reduction in coercive force.

Apparatuses used in the above described embodiments may be arbitrary known apparatuses as described in "Jisei Hakumaku Kogaku (Magnetic Thin film Technology)" Jiki Kogaku Koza 5, Written by Shuichi Iida etc. and published by Maruzen K.K. on June 30, 1977.

As heretofore described, a thin film magnetic head having a magnetic core comprising a Co-Ni-Fe-Pd alloy film according to the present invention is not adversely affected in its magnetic characteristics even if heat is applied thereto in the head fabrication process and has magnetic characteristics which is by no means inferior to a ternary Co-Ni-Fe alloy plated film.

We claim:

1. A thin film magnetic head comprising a substrate, a first magnetic core disposed on said substrate, a second magnetic core forming a magnetic path in conjunction with said first magnetic core, a conductor coil wound in said magnetic path and a gap formed between ends of said first magnetic core and said second magnetic core, wherein at least one of said first magnetic core and said second magnetic core includes a thin film of cobalt alloy including:
   20 to 70 atomic percent of cobalt;
   20 to 60 atomic percent of nickel;
   12 to 30 atomic percent of iron; and
   5 to 32 atomic percent of palladium.

2. A thin film magnetic head according to claim 1, wherein said thin film of cobalt alloy has a thickness of 2 μm or less.

3. A thin film magnetic head according to claim 1, wherein said thin film of cobalt alloy has soft magnetic properties and uniaxial anisotropy and has a hard axis of magnetization in a direction of the magnetic path.

4. A thin film magnetic head according to claim 1, wherein said thin film of cobalt alloy has a columnar crystal structure with crystals extending in a direction perpendicular to a film surface, has soft magnetic properties and uniaxial anisotropy, and has a hard axis of magnetization in a direction of the magnetic path.

5. A thin film magnetic head according to claim 1, wherein said thin film of cobalt alloy comprises a thin film formed by sputtering, has soft magnetic properties and uniaxial anisotropy, and has a hard axis of magnetization in a direction of the magnetic path.

6. A thin film magnetic head according to claim 1, wherein said thin film of cobalt alloy has a columnar crystal structure with crystals extending in a direction perpendicular to a film surface, has soft magnetic properties and uniaxial anisotropy, has a hard axis of magnetization in a direction of the magnetic path, has a magnetostriction constant of $2 \times 10^{-6}$ – $-2 \times 10^{-6}$, and has a saturation magnetic flux density of 1.2 tesla or more.

7. A thin film magnetic head according to claim 1, wherein said thin film of cobalt alloy comprises a cobalt alloy thin film having a crystalline structure.

8. A thin film magnetic head according to claim 1, wherein said thin film of cobalt alloy has soft magnetic properties and uniaxial anisotropy and has a hard axis of magnetization in a direction of the magnetic path.

9. A thin film magnetic head according to claim 1, wherein said thin film of cobalt alloy has a columnar crystal structure with crystals extending in a direction perpendicular to a film surface, has soft magnetic properties and uniaxial anisotropy, has a hard axis of magnetization in a direction of the magnetic path, and has a trapezoidal section wherein a length of a lower surface of the thin film of cobalt alloy is larger than a length of an upper surface thereof.

10. A thin film magnetic head according to claim 1, wherein at least one of said first core and said second magnetic core comprises two layers of said thin film of cobalt alloy, and said thin film of cobalt alloy and another material film are alternately laminated.

11. A thin film magnetic head according to claim 10, wherein said another material film comprises a nonmagnetic material.

12. A thin film magnetic head according to claim 11, wherein said nonmagnetic material comprises a ceramic.

13. A thin film magnetic head according to claim 10, wherein said thin film of cobalt alloy has a columnar crystal structure.

14. A thin film magnetic head according to claim 13, wherein a ratio h/d of column height h of said columnar crystal structure to column width d is 10 or less in average.

15. A thin film magnetic head according to claim 10, wherein said thin film of cobalt alloy has soft magnetic properties and uniaxial anisotropy and has a hard axis of magnetization in a direction of the magnetic path.

16. A thin film magnetic head according to claim 1, wherein said cobalt alloy further includes up to 1 atomic percent of one or more of yttrium, titanium, zirconium, hafnium, molybdenum, copper, indium, silicon, bismuth, aluminum, iridium, rhodium and platinum.

17. A thin film magnetic head according to claim 1, wherein said cobalt alloy consists essentially of 20–70 atomic percent of cobalt, 20–60 atomic percent of nickel, 12–30 atomic percent of iron and 5–30 atomic percent of palladium.

18. A thin film magnetic head according to claim 1, wherein said cobalt alloy consists essentially of 20–70 atomic percent of cobalt, 20–60 atomic percent of nickel, 12–30 atomic percent of iron, 5–32 atomic percent of palladium and up to 1 atomic percent of one or more of yttrium, titanium, zirconium, hafnium, molybdenum, copper, indium, silicon, bismuth, aluminum, iridium, rhodium and platinum.

* * * * *